(12) United States Patent
Østrem et al.

(10) Patent No.: US 12,078,768 B2
(45) Date of Patent: Sep. 3, 2024

(54) SYSTEM FOR ATTACHING SUBSEA EQUIPMENT TO A LINE

(71) Applicant: MAGSEIS FAIRFIELD AS, Oslo (NO)

(72) Inventors: Erik Østrem, Oslo (NO); Eiven Undheim, Klepp Stasjon (NO); Liam James Flood, Lysaker (NO)

(73) Assignee: MAGSEIS FAIRFIELD AS, Oslo (NO)

( * ) Notice: Subject to any disclaimer, the term of this patent is extended or adjusted under 35 U.S.C. 154(b) by 1018 days.

(21) Appl. No.: 16/978,789

(22) PCT Filed: Feb. 25, 2019

(86) PCT No.: PCT/NO2019/050042
§ 371 (c)(1),
(2) Date: Sep. 8, 2020

(87) PCT Pub. No.: WO2019/182454
PCT Pub. Date: Sep. 26, 2019

(65) Prior Publication Data
US 2021/0072414 A1    Mar. 11, 2021

(30) Foreign Application Priority Data
Mar. 21, 2018 (NO) .................................. 20180398

(51) Int. Cl.
*G01V 1/20* (2006.01)
*F16G 11/10* (2006.01)
*G01V 1/38* (2006.01)

(52) U.S. Cl.
CPC ............ *G01V 1/202* (2013.01); *F16G 11/101* (2013.01); *G01V 1/3843* (2013.01)

(58) Field of Classification Search
CPC ...... G01V 1/202; G01V 1/3843; F16G 11/101
See application file for complete search history.

(56) References Cited

U.S. PATENT DOCUMENTS

| 4,644,617 A | * | 2/1987 | Tupper | .................... F16G 11/10 24/114.5 |
|---|---|---|---|---|
| 6,024,344 A | * | 2/2000 | Buckley | ............... G01V 1/3852 367/76 |

(Continued)

FOREIGN PATENT DOCUMENTS

| CN | 101484740 A | 7/2009 |
|---|---|---|
| CN | 205319347 U | 6/2016 |

(Continued)

OTHER PUBLICATIONS

International Search Report issued in PCT/NO2019/050042, Oct. 5, 2019, pp. 1-3.

(Continued)

*Primary Examiner* — Christine M Mills
*Assistant Examiner* — Matthew J Sullivan
(74) *Attorney, Agent, or Firm* — Sage Patent Group

(57) ABSTRACT

A system (100) for attaching devices of subsea equipment to a line (10) comprising a line holding mechanism (11,110) and a line holding unit (404). The line holding unit (404) comprises a 5 longitudinal slit (403) for receiving the line (10), multiple gripping elements (13,130,230), and at least one resilient element (12,120,220), related to one subsea device. The resilient element(s) is/are configured to force the multiple gripping elements (13; 130,230) in a direction towards the line (10), whereby the line holding unit (404) is locked to the line (10) in a locking position. By the invention an improved latching device and an accompanying system for attaching and 10 detaching subsea equipment to and from a line is obtained.

8 Claims, 5 Drawing Sheets

(56) References Cited

U.S. PATENT DOCUMENTS

| | | | | |
|---|---|---|---|---|
| 8,149,647 | B2* | 4/2012 | Borgen | G01V 1/38 367/20 |
| 10,641,914 | B2* | 5/2020 | Rokkan | G01V 1/201 |
| 10,746,891 | B2* | 8/2020 | Campbell | G01V 1/3843 |
| 10,976,454 | B2* | 4/2021 | Liu | G01V 1/166 |
| 11,086,039 | B2* | 8/2021 | Mann | H01R 13/523 |
| 11,199,639 | B2* | 12/2021 | Morrish | G01V 1/52 |
| 11,247,760 | B2* | 2/2022 | Hall | B63H 9/10 |
| 11,255,411 | B2* | 2/2022 | O'Toole | E05C 19/14 |
| 11,313,985 | B2* | 4/2022 | Dudley | G01V 1/201 |
| 11,577,807 | B2* | 2/2023 | Prevel | B63B 22/003 |
| 2003/0227822 | A1* | 12/2003 | Grieger | G01V 1/201 367/20 |
| 2010/0239367 | A1 | 9/2010 | Olivier | |
| 2015/0362606 | A1* | 12/2015 | Henman | B63B 21/66 367/15 |
| 2018/0058541 | A1* | 3/2018 | Brett | F16G 11/106 |
| 2018/0106921 | A1 | 4/2018 | Rokkan | |
| 2023/0073383 | A1* | 3/2023 | Nyfors | G01F 1/66 |

FOREIGN PATENT DOCUMENTS

| | | |
|---|---|---|
| DE | 2715564 A1 | 10/1977 |
| EP | 0120047 B1 | 4/1987 |
| GB | 1273362 A | 5/1972 |
| GB | 1273363 | 5/1972 |
| GB | 1574238 A | 9/1980 |
| NO | 20170519 | 10/2018 |
| WO | 2015189415 | 12/2015 |
| WO | 2016020500 | 2/2016 |
| WO | 2016130019 | 8/2016 |

OTHER PUBLICATIONS

Written Opinion issued in PCT/NO2019/050042, Apr. 26, 2019, pp. 1-6.

Office Action mailed Jan. 19, 2023 for Chinese Patent Application No. 201980019901.6, 7 pages.

Extended European Search Report mailed Oct. 27, 2021 for European Patent Application No. 19771875.2, 6 pages.

* cited by examiner

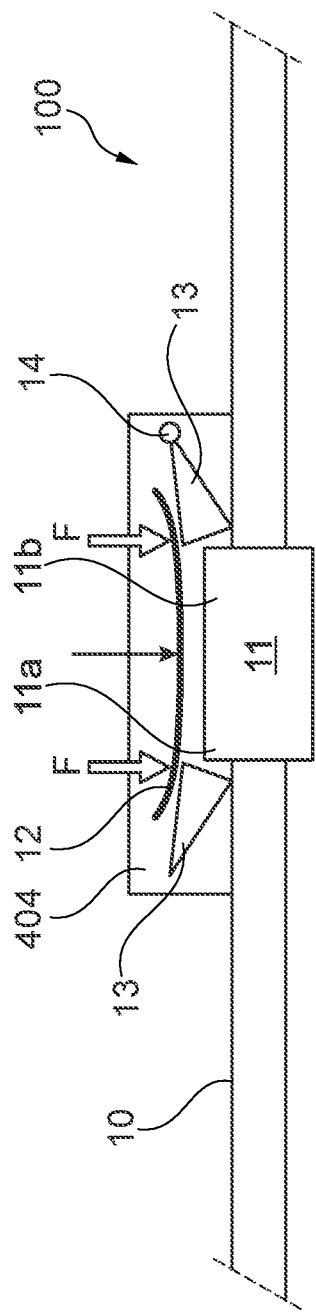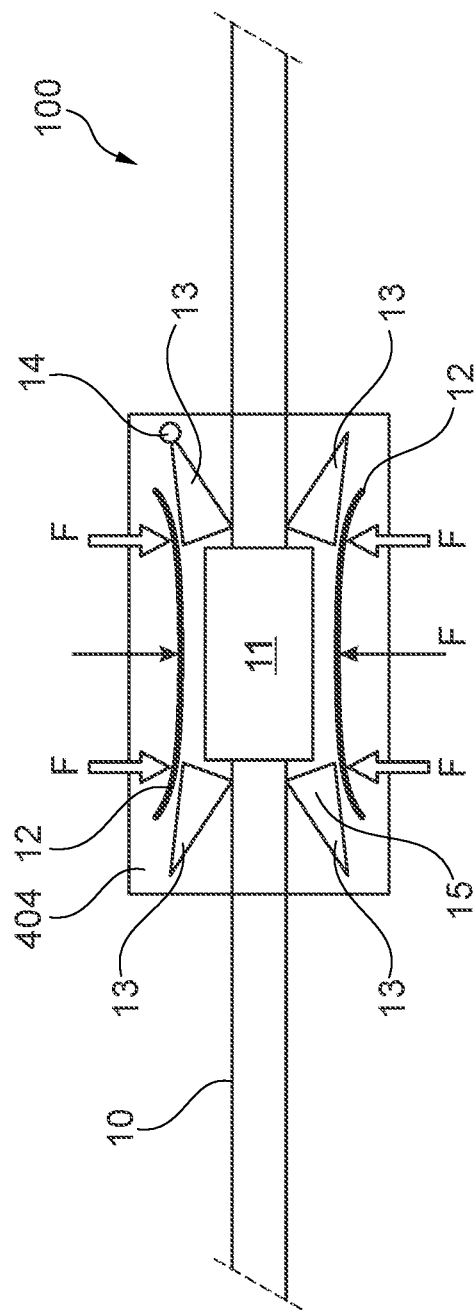

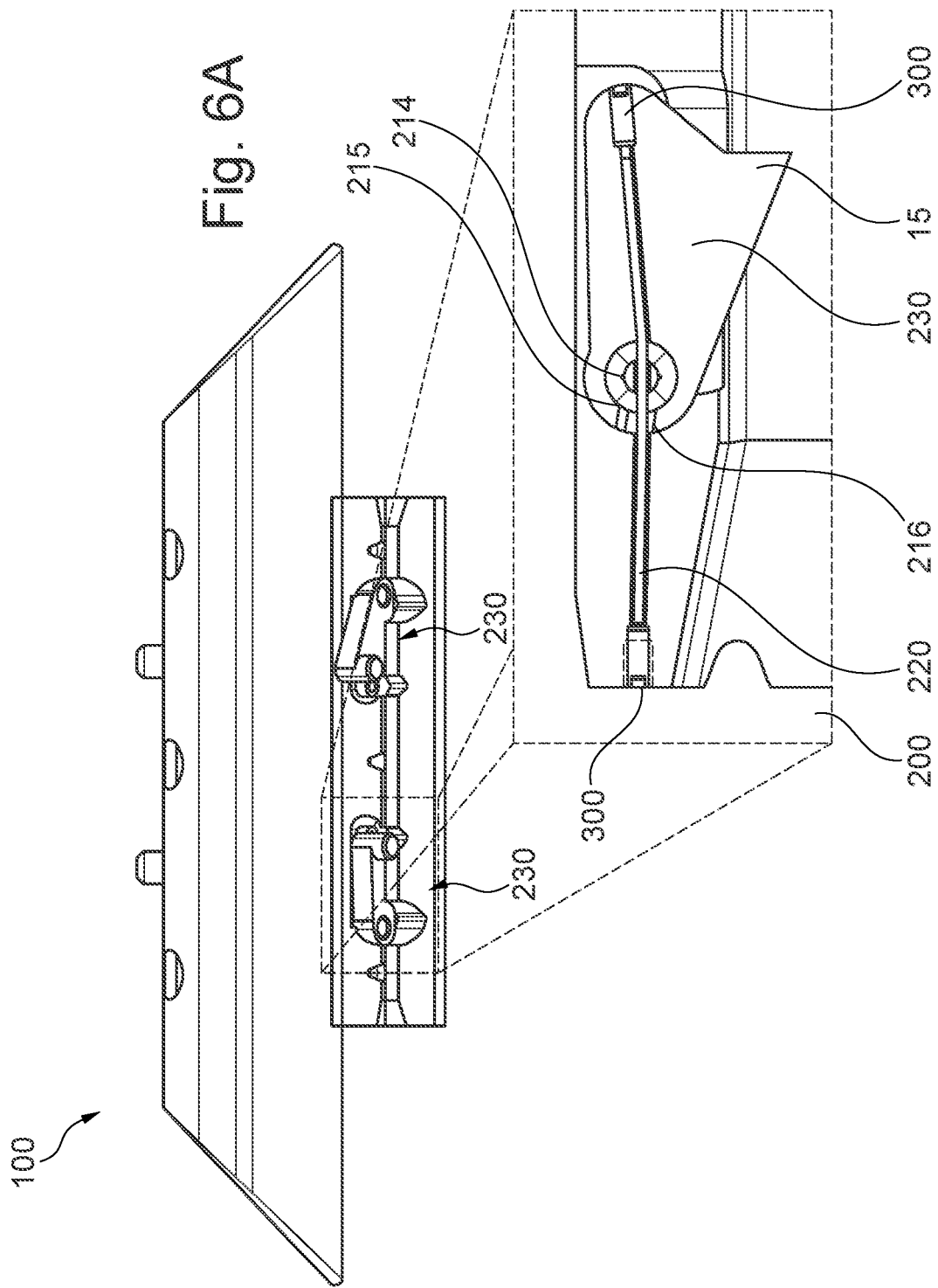

SYSTEM FOR ATTACHING SUBSEA EQUIPMENT TO A LINE

BACKGROUND

Field of the Invention

The present invention concerns a system for attaching subsea equipment to a line.

Prior and Related Art

In ocean bottom seismic and longline fishing there is a general need to attach equipment to a line, deploy the equipment into the sea, retrieve and release the equipment at a later time and spool the line onto a drum. Here, a 'line' is a thin rope with diameter in the range from about 1 mm to about 25 mm made from steel or a synthetic material.

The fields of art are already connected. For example, U.S. Pat. Nos. 7,933,165 and 8,087,848 regard deployment of seismic equipment to a seafloor. Both patents refer to U.S. Pat. No. 4,920,680, which discloses a device for tensioning a longline.

The present invention regards a system for attaching equipment to a line during deployment to the sea and releasing the equipment during retrieval from the sea. Proper tensioning of the line during attachment and release is assumed.

The system used for attaching equipment must be resistant to seawater, and a small loss of equipment may be acceptable. In practice, these requirements exclude mechanically complex clamps such as most clamps with safety functions used for ski lifts and other rope conveyors on dry land.

US20100054078 describes a powered sheave and a cable with attachment points or collars affixed to the cable. This facilitates attachment of equipment at a workstation.

U.S. Pat. No. 6,024,344 discloses a similar clasp grasping a wire. A loop is arranged between wire clasps. This and the following prior art concerns seismic nodes exclusively.

Seismic nodes must be decoupled acoustically from a tight or tensioned cable. This can be done by feeding out excess rope, by attaching the node by a loose coupling as in the previous patent or by providing a stress-relief between the node and the cable/rope/line.

US 2004/0065443 discloses holders permanently attached to a cable. The holders are spooled onto the drum together with the cable. Seismic equipment is inserted into the holders during deployment and removed from the holders during retrieval.

WO2014084741 describes similar containers permanently attached to a rope, and a trolley running along the rope during deployment and retrieval. This facilitates insertion and extraction of nodes.

US20110051550 describes two attachment points per node

US 20060002230 describes a latch for releasing a node on the seabed, and US2006159524 describes using an ROV for deployment.

U.S. Pat. No. 9,541,663 describes an installation device for automatically attaching and detaching seismic devices to a deployment cable, including a plurality of autonomous seismic nodes. The installation device comprises several loose parts.

To the best of our knowledge, the closest prior art for the present invention is NO 337633 B1, which discloses an attachment device for attaching a seismic node to a cable. The attachment device comprises an inline fastening device fastening the cable and a locking device preventing the cable from escaping the fastening device.

The objective of the present invention is to provide an improved latching device and an accompanying system for attaching and detaching subsea equipment to and from a line.

SUMMARY OF THE INVENTION

This is achieved by a system according to claim 1.

In particular, the invention concerns a system for attaching devices of subsea equipment to a line, the system comprising a line holding mechanism and a line holding unit comprising a longitudinal slit for receiving the line, and the system further comprises that the line holding unit comprises multiple gripping elements, and at least one resilient element, related to one subsea device, said resilient element(s) is/are configured to force the multiple gripping elements in a direction towards the line, whereby the line holding unit is locked to the line in a locking position.

The line holding unit is arranged freely rotating around the longitudinal axis of the line holding mechanism.

By the expression "in a direction towards" is to understand that the gripping elements are moved in the direction towards the line. The attachment may be done in such a way, that the gripping elements are placed in an end-position resting against an end of an increased diameter of the line—provided by the line holding mechanism—thereby providing mechanical stop means. This prevents the line in moving by this mechanical stop means. Another possibility is the gripping elements are firmly attached against the line preventing the line in moving by means of friction force. The gripping elements are in both cases interacting with the line holding mechanism.

Devices of subsea equipment may be devices such as seismic nodes and acoustic devices, each device kept in place by a line holding mechanism and the gripping elements of the line holding unit related thereto.

In an embodiment, the resilient element(s) is/are a spring such as a leaf spring, a spring wire or a compressible device providing a force F towards the gripping element.

In an embodiment, each gripping element comprises a hinge, and the resilient element holds a portion of the gripping element closer to the line than its hinge when the line holding unit is locked to the line in the locking position.

The gripping elements are adapted to take one of two positions. This locked position is one of them. An open position is the other. The gripping element may be hinged around a bolt. The resilient element pushes the gipping element towards the locked position all the time. Then it is forced open by an opening force. Either this is done by the line holding mechanism (when clamping the line holding unit onto the cable), or by an opening device (when taking the line holding unit off the cable) and as soon as this opening force is released the gripping element goes back to the locking position. It cannot stay open unless an opening force is applied to it.

In a further embodiment, each resilient element is arranged about the line holding mechanism and adapted to move from an open position, wherein the resilient element(s) does/do not move the gripping elements in a direction towards the line, to the locking position, wherein the resilient element(s) is/are adapted to press in a direction towards the line whereby the line holding unit is locked to the line.

A rotation of the line holding unit relative to the line holding mechanism during deployment and retrieval, is preferably done by a tapered guide.

In an embodiment each line holding unit comprises at least two gripping elements, and at least one resilient element, related to one subsea device, said gripping elements are arranged in the longitudinal direction of the line holding mechanism at the same side of the line and placed close to and on either side of the line holding mechanism related to same subsea device.

In a preferred embodiment, the system comprises that each gripping element is influenced by at least one resilient element, said each resilient element acting on one gripping element is providing a force in the direction towards the line independent of the other resilient elements acting on other gripping elements, and each resilient element is configured to force the gripping element in question in the direction towards the line, whereby the line holding unit is locked in the locking position by each gripping element independent of the other gripping element(s).

Each gripping element may have its own independent resilient element/spring. There are two main advantages with this construction: One is that failure of one resilient element does not affect the other resilient element and thereby does not affect the other gripping element. Further, the construction is thought to handle dirt and environment in a more optimal way thereby making the design robust. However, a pair of gripping elements placed on the same side of the line and on either side of the line holding mechanism may interact with just one resilient element making the construction more simple and cheaper.

In an embodiment, the line holding mechanism comprises an enlarged diameter compared with the diameter of the line providing a cylindrical thickening of the line The enlarged diameter of the line holding mechanism has an extent in the longitudinal direction that is a little smaller that the distance between two opposing gripping elements. By two opposing gripping elements is to understand that the gripping elements are placed on either side of the line holding mechanism in the longitudinal direction of the line.

The line holding mechanism may be a sleeve crimped on the line or it may be an element welded, moulded, bolted or in other ways placed on and fastened to the line. It is a solid element where the diameter is larger than the line. When gripping elements are placed opposite each other on either side of the line, the diameter of the sleeve is larger than the distance measured between interacting part of the gripping elements in the closed position thereby providing a mechanical lock of the line, and locking the subsea device attached to this part of the line to the chosen position. The length of the sleeve is a little shorter than the distance between gripping elements placed on the same side of the line and fastening the subsea device to the line.

In an embodiment, the line holding mechanism is made from a resilient material, e.g. a block of natural or synthetic rubber. The gripping elements are serrated surfaces and the line holding mechanism comprises a guiding face for opening the longitudinal slit.

Preferably, the longitudinal slit deviates from a straight line between the ends of the line holding mechanism. This helps preventing the line holding mechanism from sliding along the line.

In one embodiment, the system further comprises a rotating device such as a wheel, or at non-rotating smooth and sliding device, said device is configured to push and/or assist the line into the longitudinal slit during deployment.

In one embodiment, the system further comprises a connection, said connection is placed between a housing for enclosing devices for subsea equipment and the line holding unit, or the connection is placed directly between a line holding unit and subsea equipment.

The system may comprise a housing with a connection to the line holding unit. The housing is useful for seismic applications However; the line holding unit may also be connected directly to subsea equipment by the connection. The connection may comprise a shock absorber to protect seismic equipment landing on the seafloor. The function of the shock absorber is to decouple the housing or the subsea equipment from the line as much as possible, in order to avoid vibrations/movement of the cable to influence the equipment. It may be made of dampening elements—such as a spring or damping material comprising elastic properties such as rubber—in order to create a dampening transfer function between the cable and the housing.

The line holding unit is preferably made without loose parts. All elements are integrated in the line holding unit.

BRIEF DESCRIPTION OF THE DRAWINGS

The invention will be explained with reference to exemplary embodiments and the accompanying drawings, in which:

FIG. 1A illustrates a first embodiment of a system according to the invention in a closed state.

FIG. 1B illustrates a second embodiment of a system according to the invention in a closed state

FIG. 6A illustrates a fourth embodiment of the system according to the invention and in a closed state.

FIG. 6B illustrates an enlarged and sectional view of the fourth embodiment of the system according to the invention shown in FIG. 6A.

DETAILED DESCRIPTION OF A PREFERRED EMBODIMENT

The drawings are schematic and not to scale. Numerous details known to the skilled person are omitted from the drawings and the following detailed description.

Figure 2A:
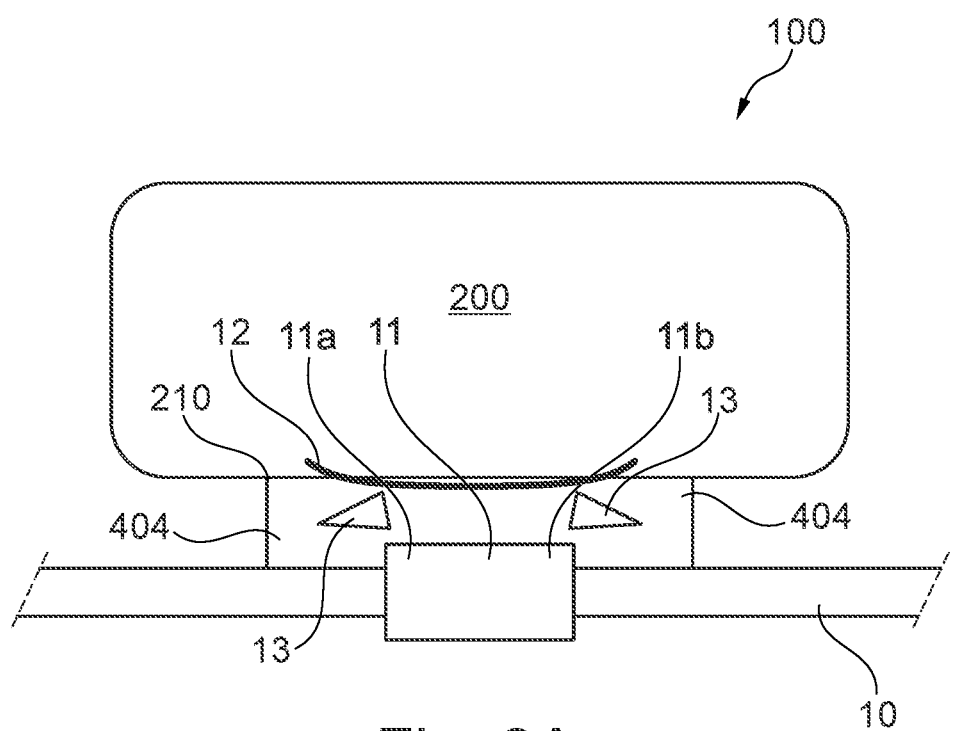
FIG. 2A illustrates the first embodiment of a system according to the invention in an open state.

FIG. 1A illustrates a line 10 and a first embodiment of a system 100 in a closed state. The system 100 comprises a line holding mechanism 11 and a line holding unit 404. The line holding unit 404—made in an appropriate material such as metal or reinforced plastic material—includes in this case one resilient element 12 acting on two gripping elements 13 placed on the same side of the line and at each end 11a,11b of the line holding mechanism 1. The resilient element 12 exert a spring force F on several gripping elements 13 in this case two gripping elements. Each gripping element 13 has a hinge 14, here at the apex of an isosceles triangle. A portion 15 of each triangle is closer to the line 10 than its hinged apex. The gripping element 13 could also be a longitudinal element hinged in one end and the other end resting against or placed close to an end of the line holding mechanism 11 when the system is in its locked position. The gripping elements 13 are in the locking position in FIG. 1A; an open position of the gripping elements is shown in FIG. 2A. The construction of the line holding mechanism 11 is explained below.

FIG. 2A shows the system 100 in an open state. The line 10 is visible in a longitudinal slit as necessary for entering and removing the line holding mechanism 11 from the line holding unit 404. FIG. 2A also depicts a housing 200 for seismic equipment. The housing 200 and the line holding unit 404 are affixed to each other and can be turned freely around the line 10 and line holding mechanism 11.

The line holding mechanism 11 is in this embodiment a sleeve crimped on the line 10 or it may be an element welded, moulded, bolted on the wire or otherwise fastened. The line holding mechanism 11 may also be constructed during the manufacturing of the line thereby making it an integrated part of the line 10. The line holding mechanism 11 is a cylindrical piece and permanently or semi-permanently attached to or integrated with the line 10. It may be removed by drilling or other mechanical means. It is mounted on the line 10 so it is motionless in relation to this during the use of the system 100. The length of the sleeve is a little shorter than the distance between the gripping elements 13. The diameter of the sleeve is larger than the diameter of the line 10 and is designed and dimensioned in such a way that the two end sections 11a,11b of the sleeve 11 makes a mechanical stop for the gripping elements. Thereby the line holding unit 404 is fastened to the line and thereby the seismic equipment attached to the line holding unit 404 is fastened/locked to the line 10.

A connection 210 between the line holding unit 404 and the housing 200 preferably contains a shock absorber for reducing the inertial forces applied to the subsea equipment during deployment. The connection 210 may also be directly between the line holding unit 404 and subsea equipment.

Figure 2B:
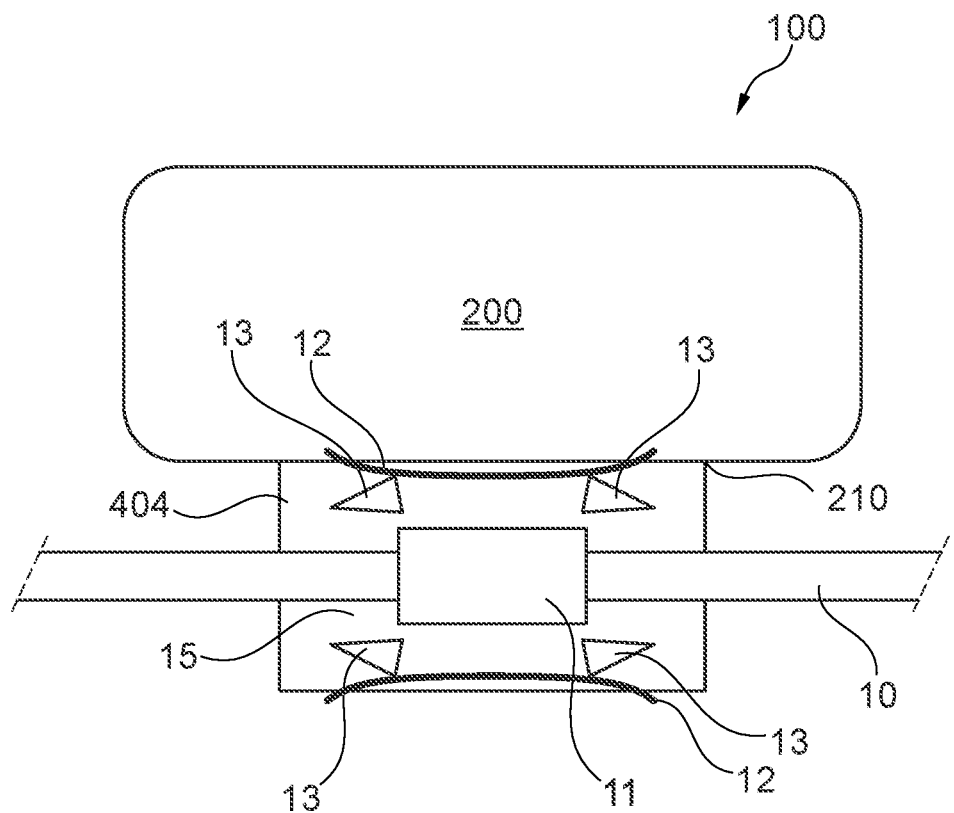
FIG. 2B illustrates the second embodiment of a system according to the invention in an open state.

FIG. 1B and FIG. 2B show a second embodiment of the system 100 according to the invention. The difference between FIG. 1A, FIG. 2A and FIG. 1B, FIG. 2B is the number of gripping elements 13 and the number of resilient elements 12. In FIG. 1B and FIG. 2B the line holding unit 404 comprises 4 gripping elements 13. They are placed on either side of the line 10. Further, they are placed on either side of the line holding mechanism 11 as is the case with embodiment first.

One of the resilient elements 12 is acting on the two gripping elements 13 placed at one side of the line 10 and the other resilient element 12 is placed opposite the first resilient element 12 and acting on the two other gripping elements 13. By this arrangement, the locking of the line holding unit 404 to the line is made more secure.

Figure 3:
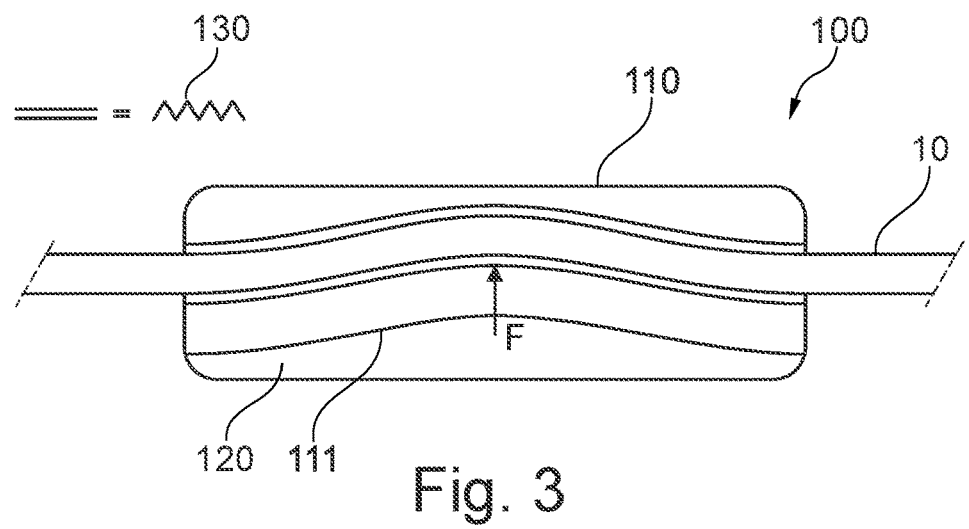
FIG. 3 illustrates a third embodiment of the system according to the invention in a closed state.

FIG. 3 illustrates a third embodiment of the line holding mechanism 110 in a closed state. Here, the line holding mechanism 110 is made from a resilient material, e.g. rubber, which provides a kind of spring 120 and the spring force F exerted on the line 10. The gripping elements 130 are serrated surfaces and the line holding mechanism 110 comprises a guiding face 111 for opening the longitudinal slit.

Figure 4:
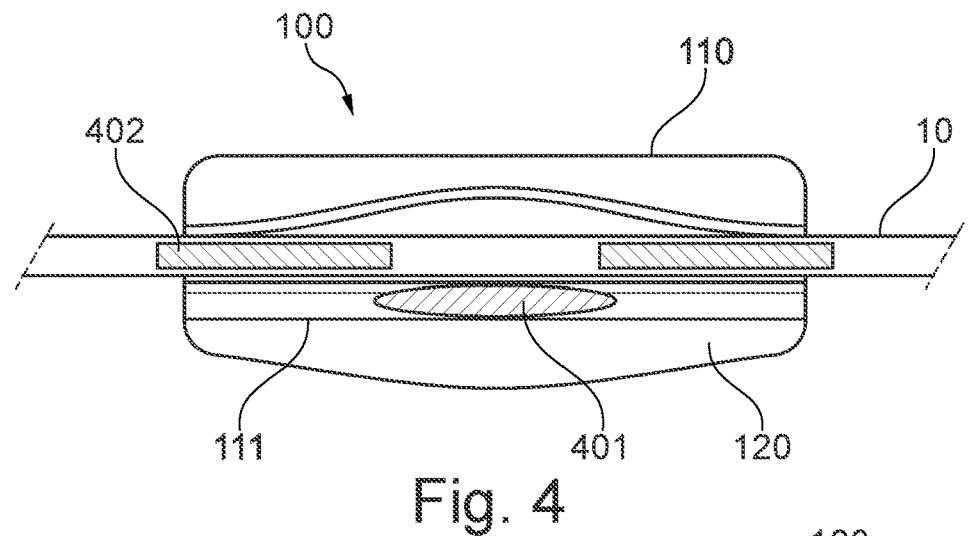
FIG. 4 illustrates a system and the third embodiment of the system according to the invention in an open state.

FIG. 4 illustrates a system 100 comprising an opener 401 arranged to slide along the guiding face 111, which is shown as a straight line in FIG. 4. This causes an elastic deformation in the line holding mechanism 110 and opens the longitudinal slit for insertion or removal of the line 10. Wheels 402 pushes the line 10 into the longitudinal slit.

Figure 5:
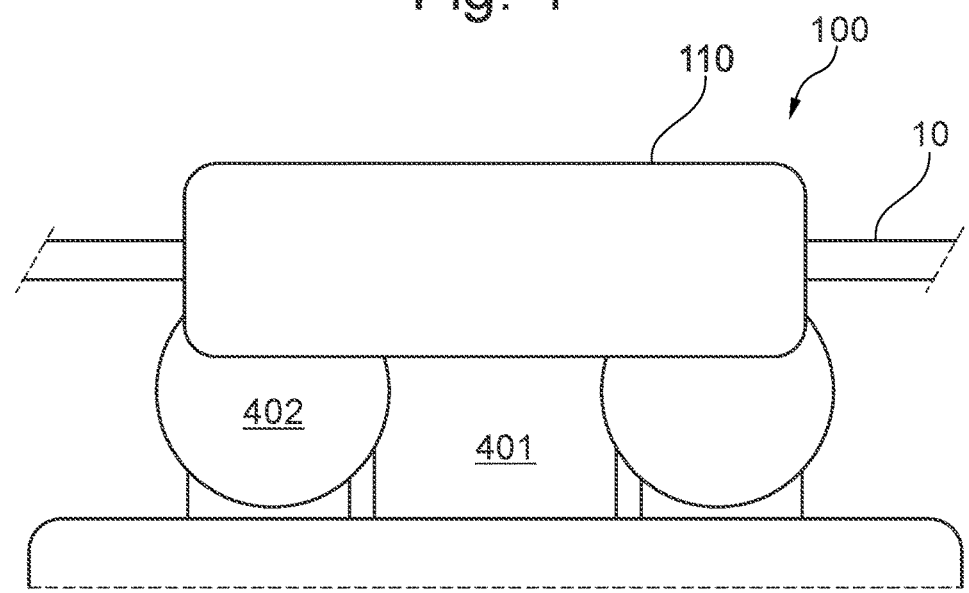
FIG. 5 is a side view of the system in FIG. 4.

FIG. 5 is a side view of the system 100 in FIG. 4. The opener 401 is partially hidden behind the wheels 402, and both are hidden behind a side of the line holding mechanism 110.

FIG. 6A illustrates a fourth embodiment of the system 100. It shows the system 100 according to the invention and in a closed state comprising two separate pairs of gripping elements 230 working independent of each other. FIG. 6B illustrates an enlarged and sectional view of a part of the system 100 shown in FIG. 6A.

The system 100 comprises the line holding mechanism (not shown), two pairs of independent gripping elements 230 and two pairs of—independent of each other—resilient elements 220, each configured as a straight spring wire. Each resilient element is acting independently of other resilient elements on one of the gripping elements 230. The gripping elements are placed in the same way, as is the case in FIG. 1B and FIG. 2B. That is each pair is placed at the same side of the line and linearly opposing, and the two pairs are placed opposite each other at each side of the line. The figure shows a cross-section view showing the spring 230 inside a hole through both the gripping element 230 and the line holding unit, held in place at each end by a setscrew 300. The head of a main bolt 215 holding the gripping element 230 has a cut-out 216 in its head to accommodate for the spring 220. As the gripping element 230 pivots around the bolt 215 providing a hinge 214, the spring 220 will bend. Each resilient element is acting on only one gripping element so the number of resilient elements and gripping elements are equal.

The gripping elements 230 is moved towards the line—not shown—reaching the locked position, preventing the line from sliding through the housing. The line holding mechanism is constructed exactly as explained with reference to FIGS. 1A,B and 2A,B, the line holding mechanism comprising a sleeve placed around the line in the section that has to be locked. If one gripping element 230 is failing, the other gripping element 230 will take over the entire locking of the line. In this embodiment, two pairs of gripping elements 230 are shown. However, the system may comprise even less or more pairs of gripping elements 230 such as 3 or 4 or 5 or more. In that case, the same number of pairs of resilient elements 220 are provided: 3 or 4 or 5 or more.

Figure 6C:
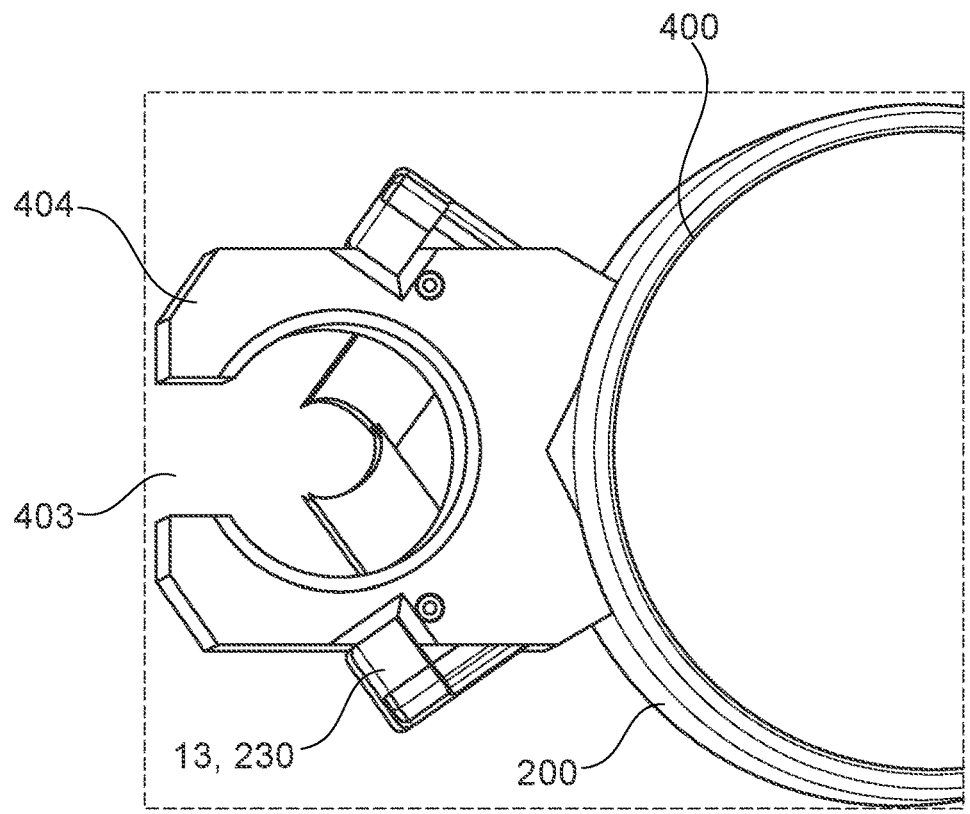
FIG. 6C shows a perspective view of a C-shaped opening placed in a line holding unit.

FIG. 6C shows a perspective view of the line holding unit 404 comprising the longitudinal slit 403 designed as a C-shaped opening. The line holding mechanism 404 goes into the opening when constructed as a sleeve. A housing 200 attached to the line holding unit 404 encloses a part of the seismic equipment 400, which this housing 200 is designed to hold. The seismic equipment 400 may for instance be a seismic node, an acoustic transponder or other subsea equipment.

Figure 6D:
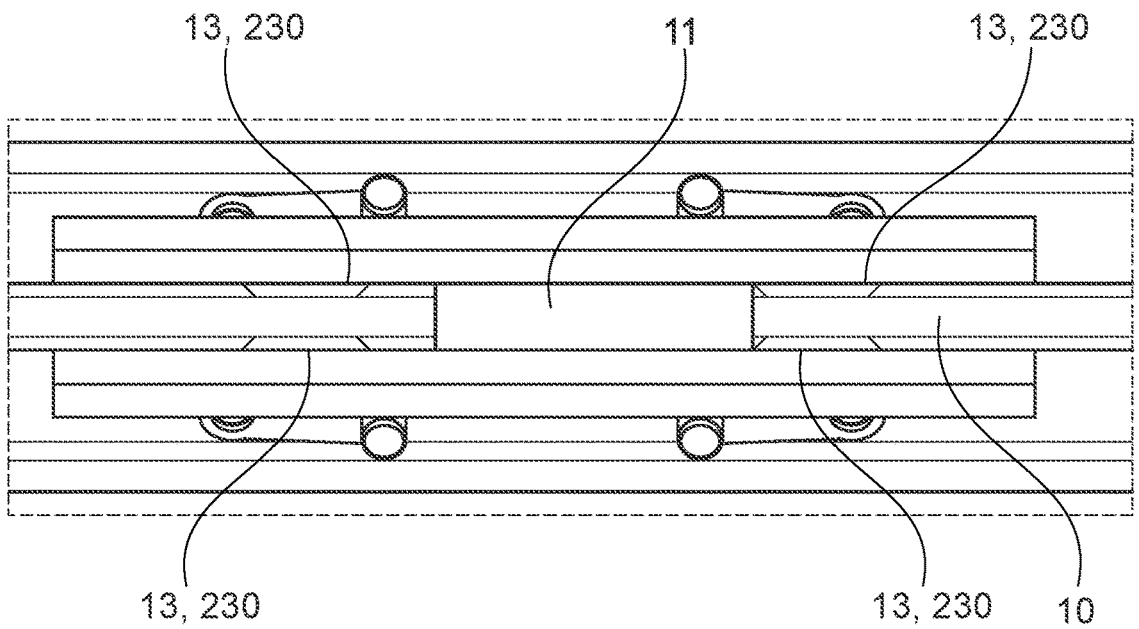
FIG. 6D shows an enlarged view of a line comprising a line holding mechanism used in the embodiments shown in FIG. 6A,B and in FIG. 1A,B, 2A,B.

FIG. 6D shows an enlarged view of a line 10 comprising a line holding mechanism 11 designed as described with reference to FIG. 6A,B and FIG. 1A,B, 2A,B. The gripping elements 13,230 are engaging the line holding mechanism 11, as they are placed symmetrical around the line 10 on either side of the line 10 and further on either side of the line holding mechanism 11. The number of gripping elements here are 4, and the number of resilient elements is 4. If the gripping elements was two and placed as disclosed in FIG. 1A and FIG. 2A the number of resilient elements would be two, each acting on one gripping element and independent of the other resilient element.

The invention has been described by way of examples. The scope of the invention is defined in the appended claims.

The invention claimed is:

1. A system for attaching devices of subsea equipment to a line comprising:
 a line holding mechanism, wherein the line holding mechanism is made from a resilient material; and
 a line holding unit comprising a longitudinal slit for receiving the line, wherein the line holding unit comprises a plurality of gripping elements and at least one resilient element related to one subsea device, the at least one resilient element is configured to force the plurality of gripping elements in a direction towards the line, wherein the line holding unit is locked to the line in a locking position, wherein the plurality of gripping elements are serrated surfaces and wherein the line holding mechanism comprises a guiding face for opening the longitudinal slit, wherein the line holding unit comprises at least two gripping elements and at least one resilient element related to the subsea device, the at least two gripping elements are arranged in the longitudinal direction of the line holding mechanism at the same side of the line and placed close to and on either side of the line holding mechanism related to same subsea device.

2. The system according to claim 1, wherein the at least one resilient element is a spring device comprising a leaf spring, a spring wire or a compressible device providing a force towards the plurality of gripping elements.

3. The system according to claim 1, wherein the plurality of gripping elements comprise a hinge and the at least one resilient element holds a portion of at least one gripping element of the plurality of gripping elements closer to the line than the hinge when the line holding unit is locked to the line in the locking position.

4. The system according to claim 1, wherein the at least one resilient element is arranged about the line holding mechanism and the at least one resilient element adapted to move from an open position, wherein the at least one resilient element does not move the plurality of gripping elements in a direction towards the line, and wherein the at least one resilient element is adapted to press in a direction towards the line whereby the line holding unit is locked to the line.

5. The system according to claim 1, wherein each gripping element of the plurality of gripping elements is influenced by the at least one resilient element, the at least one resilient element acting on one gripping element of the plurality of gripping elements is providing a force in the direction towards the line independent of other resilient elements acting on other gripping elements of the plurality of gripping elements, and the at least one resilient element is configured to force the gripping element of the plurality of gripping elements in question in the direction towards the line, whereby the line holding unit is locked in the locking position by each gripping element of the plurality of gripping elements independent of the other gripping elements of the plurality of gripping elements.

6. The system according to claim 1, wherein the line holding mechanism comprises an enlarged diameter compared with a diameter of the line providing a cylindrical thickening of the line.

7. The system according to claim 1, further comprising a rotating device comprising a wheel, or a non-rotating smooth and slippery device, the device is configured to push and/or assist the line into the longitudinal slit during deployment.

8. The system according to claim 1, further comprising a connection, the connection is placed between a housing for enclosing devices of the subsea equipment and the line holding unit or the connection is placed directly between the line holding unit and the subsea equipment.

* * * * *